United States Patent
Akopyan

(10) Patent No.: US 7,409,764 B2
(45) Date of Patent: Aug. 12, 2008

(54) CAKE CUTTER AND SERVER

(76) Inventor: Arshak Sh. Akopyan, 1215 E. Colorado St., Suite 202B, Glendale, CA (US) 91205

( * ) Notice: Subject to any disclaimer, the term of this patent is extended or adjusted under 35 U.S.C. 154(b) by 0 days.

(21) Appl. No.: 11/380,003

(22) Filed: Apr. 25, 2006

(65) Prior Publication Data

US 2007/0245566 A1    Oct. 25, 2007

(51) Int. Cl.
*A21C 5/08* (2006.01)
(52) U.S. Cl. ............... 30/114; 30/128; 30/136; 294/7
(58) Field of Classification Search ........... 294/1.3, 294/1.4, 7, 8, 49; 81/160; 30/124, 136, 142, 30/150, 314, 322, 324, 114, 128; 7/110; D7/669, 673, 674, 381
See application file for complete search history.

(56) References Cited

U.S. PATENT DOCUMENTS

| | | | |
|---|---|---|---|
| 461,623 A | 10/1891 | Schogh | |
| 593,386 A | 11/1897 | Williams | |
| 1,020,865 A | 3/1912 | Wieber | |
| 1,117,453 A | 11/1914 | Serrell | |
| 1,467,395 A | 9/1923 | Ross et al. | |
| 1,931,388 A | 10/1933 | Ling | |
| 2,085,372 A | 6/1937 | Lenk et al. | |
| 2,182,726 A * | 12/1939 | King et al. | 30/114 |
| 2,232,204 A | 2/1941 | Besocke et al. | |
| 2,264,648 A | 12/1941 | Smith et al. | |
| 2,322,046 A | 6/1943 | Miller | |
| 2,417,172 A | 3/1947 | Norman | |
| 2,471,466 A | 5/1949 | Weinberg | |
| 2,502,982 A | 4/1950 | Norman | |
| 2,538,154 A | 1/1951 | Hannigan | |
| 2,555,690 A | 6/1951 | Guerra | |
| 2,560,271 A | 7/1951 | Block | |
| 2,571,465 A | 10/1951 | McDevitt | |
| 2,600,646 A | 6/1952 | Haugland | |
| 2,667,829 A * | 2/1954 | Mcnutt | 99/430 |
| 2,679,687 A * | 6/1954 | Ledbetter | 30/114 |
| 2,759,261 A | 8/1956 | Setecka | |
| 2,770,035 A | 11/1956 | O'Brien | |
| 2,800,714 A | 7/1957 | Evans | |
| 2,845,705 A | 8/1958 | Jenkinson | |
| 3,888,001 A | 6/1975 | Gilbart-Smith | |
| 4,114,265 A | 9/1978 | Bailey | |

(Continued)

FOREIGN PATENT DOCUMENTS

CH        690092 A5      4/2000

(Continued)

*Primary Examiner*—Boyer D. Ashley
*Assistant Examiner*—Joseph Defrank
(74) *Attorney, Agent, or Firm*—Wagner, Anderson & Bright, LLP; Roy L Anderson

(57) ABSTRACT

A utensil for cutting and serving pastry or similar goods has operating handles made in form of tabs similar to ordinary scissors for fitting in operator's fingers, a spatula simultaneously used for cutting pastry or similar goods and holding a sliced piece and rigidly connected to the upper operating handle, blades bent in a form of a frame rigidly connected to the lower operating handle, a pusher for serving a piece of pastry or similar goods to a serving plate and a lever mechanism made in a form of pantograph for moving the pusher.

6 Claims, 7 Drawing Sheets

U.S. PATENT DOCUMENTS

| | | | |
|---|---|---|---|
| 4,411,066 A * | 10/1983 | Allahverdian | 30/114 |
| 4,553,325 A | 11/1985 | Allahverdian | |
| 4,569,130 A * | 2/1986 | Koller et al. | 30/128 |
| 4,592,139 A | 6/1986 | Huang | |
| D286,608 S | 11/1986 | Leung | |
| 4,759,125 A | 7/1988 | Olaes | |
| 4,847,998 A | 7/1989 | Colozzi et al. | |
| 5,105,915 A * | 4/1992 | Gary | 187/200 |
| 5,165,171 A * | 11/1992 | MacLean | 294/7 |
| 5,551,741 A * | 9/1996 | LaBoccetta | 294/7 |
| 5,600,891 A * | 2/1997 | Orgal | 30/226 |
| 5,662,662 A * | 9/1997 | Bishop et al. | 606/143 |
| 6,578,732 B1 * | 6/2003 | Mabry | 221/60 |
| 2003/0034662 A1 | 2/2003 | Wilson | |

FOREIGN PATENT DOCUMENTS

| | | |
|---|---|---|
| DE | 299388 | 7/1917 |
| DE | 593869 | 2/1934 |
| FR | 1277149 | 10/1961 |
| FR | 8009183 | 10/1981 |

* cited by examiner

CAKE CUTTER AND SERVER

FIELD OF INVENTION

The invention relates to utensils for cutting and serving slices of cake or similar products.

DESCRIPTION OF PRIOR ART

It is well known that there are some difficulties in slicing a piece of cake or alike and moving the sliced piece from the whole cake to serving plates. Until now, cutting and serving cakes are realized by the use of knives and spatulas because of the lack of convenient utensils for compiling those simple operations. This proposed invention contains a cake cutter and server in a single device, which allows cutting, lifting and serving a slice with one hand, and prevents a sliced piece from falling over.

Attempts to develop utensils to combine cake cutting and serving processes have been undertaken for a long time. In U.S. Pat. No. 4,759,125 to Olaes, for instance, the cake cutter-server contains blades attached to the adjustable scissor-like handles. However, the sliced piece can slide down from it while lifting because the device does not contain holding bottom part. Another invention (Publication No. US20030034662 A1 to Wilson) describes a food-serving spatula with a clamp bar operated by a thumb. This device does not contain a cutter, and it is only for low height food. Also the clamp bar can mess up a slice of cake or pie while lifting it if a thumb holding the clamp bar is released.

There are also a number of inventions that relate to serving process of sliced piece. For example, U.S. Pat. No. D286,608 contains the appliance for serving a sliced piece of food to the plate. However, there will be difficulties in moving and serving process of a sliced piece because there is very high possibility that a sliced piece will turn over if lifted with one hand.

BRIEF SUMMARY OF INVENTION

The purpose of a present invention is to create a device for cutting and serving cake or similar products, which allows cutting, lifting and serving a sliced piece with one hand.

The objects of the invention are followings:
1. To provide a cutter for a cake or similar products that will not leave some portions of a cut part attached to the whole.
2. To provide lifting device for a slice of cake or alike with one hand without falling over.
3. To provide serving device for a slice of cake or alike that will serve a sliced piece without touching it and without turning it over onto a plate.

REFERENCE NUMERALS IN DRAWINGS

201—Spatula
202—Blades
203—Pusher plate
204—Pantograph mechanism (in the box)
205—Operating handles with tabs
206—Supporting wall
207—Cover of the pantograph's box
208—Box of the pantograph
209—Connection rivet of operating handles
210—Slicing cake or alike
401—Blade slots
402—Rolls
403—Axis of the rolls
404—Axis slots
405—Intermediate arm rivets
406—Intermediate arms
407—Pantograph arms
408—Pusher rivets
409—Pusher rivets slots
410—Axis of the first arms pair of the pantograph
411—First arms pair of the pantograph
412—Screw—nuts of the pantograph's box cover
413—Returning spring of the pantograph
601—Slicing pieces of rectangular cake or alike
701—Slicing pieces of round cake or alike

DETAILED DESCRIPTION OF THE INVENTION

Figure 1:
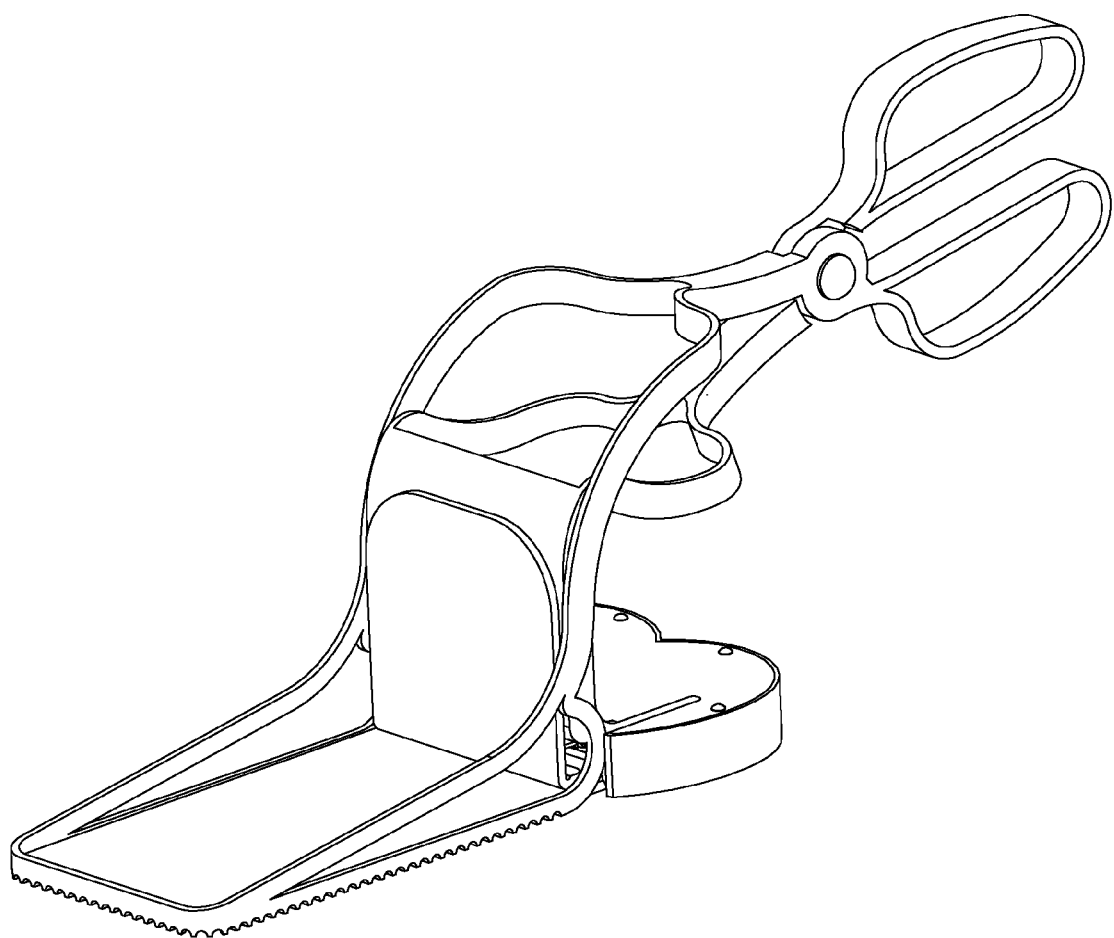
FIG. 1 is a perspective view of a cake cutter-server in inoperative position
Figure 2:
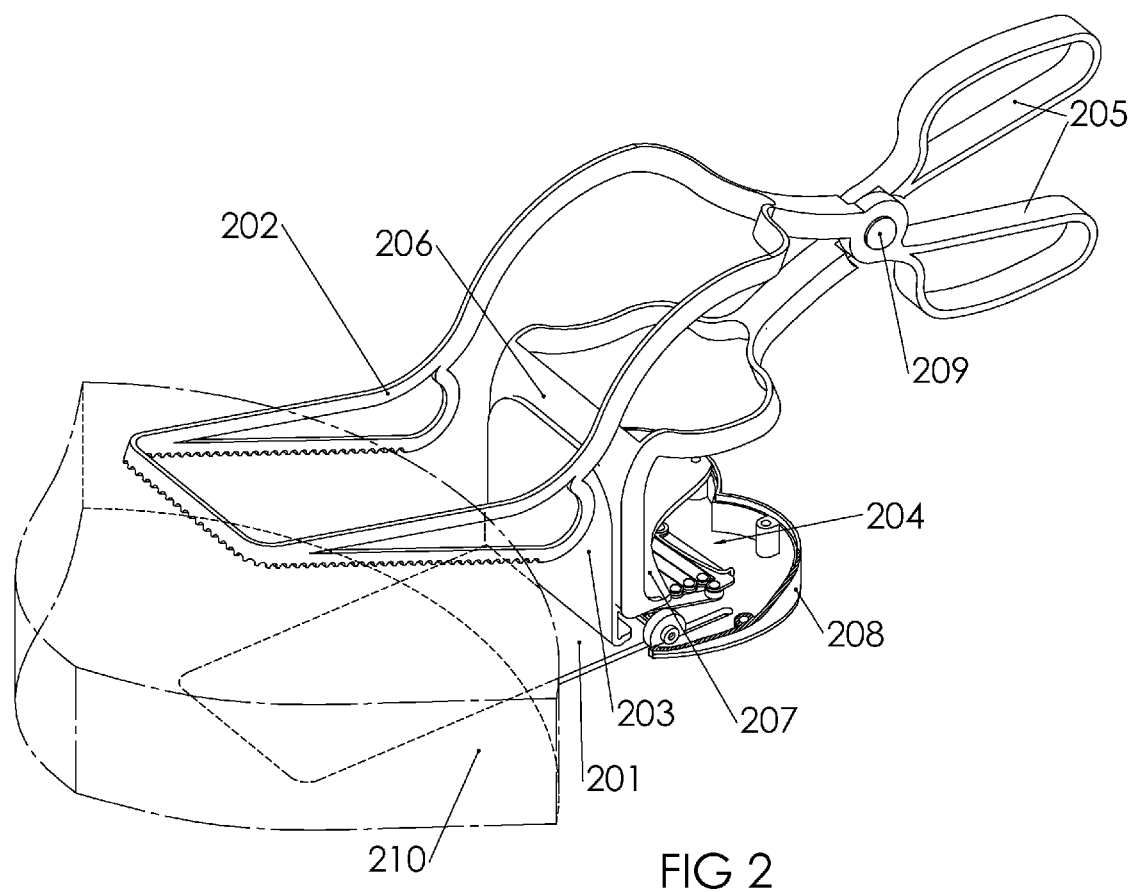
FIG. 2 is a perspective view of a cake cutter-server in its starting position
Figure 3:
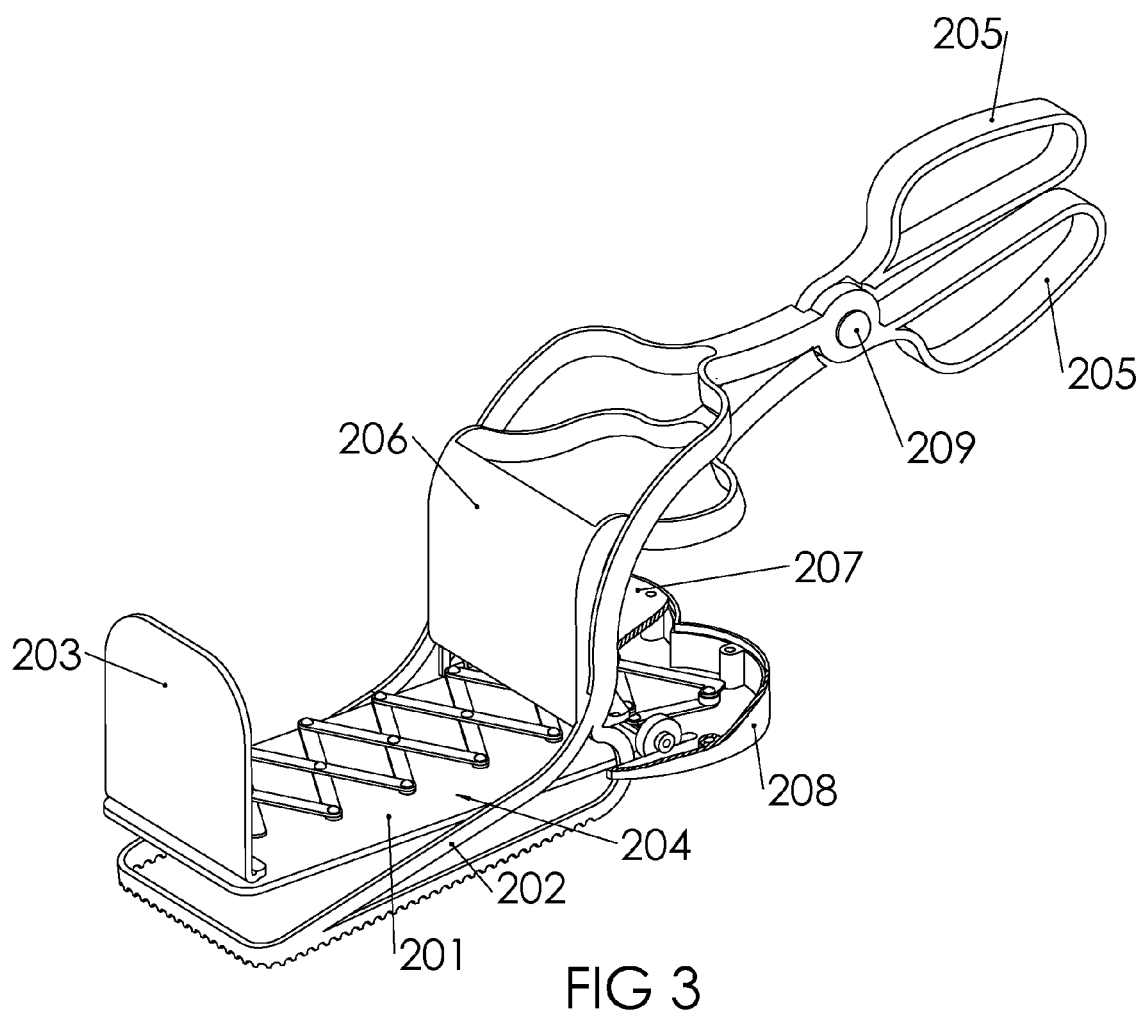
FIG. 3 is a perspective view of a cake cutter-server in its ending position
Figure 4:
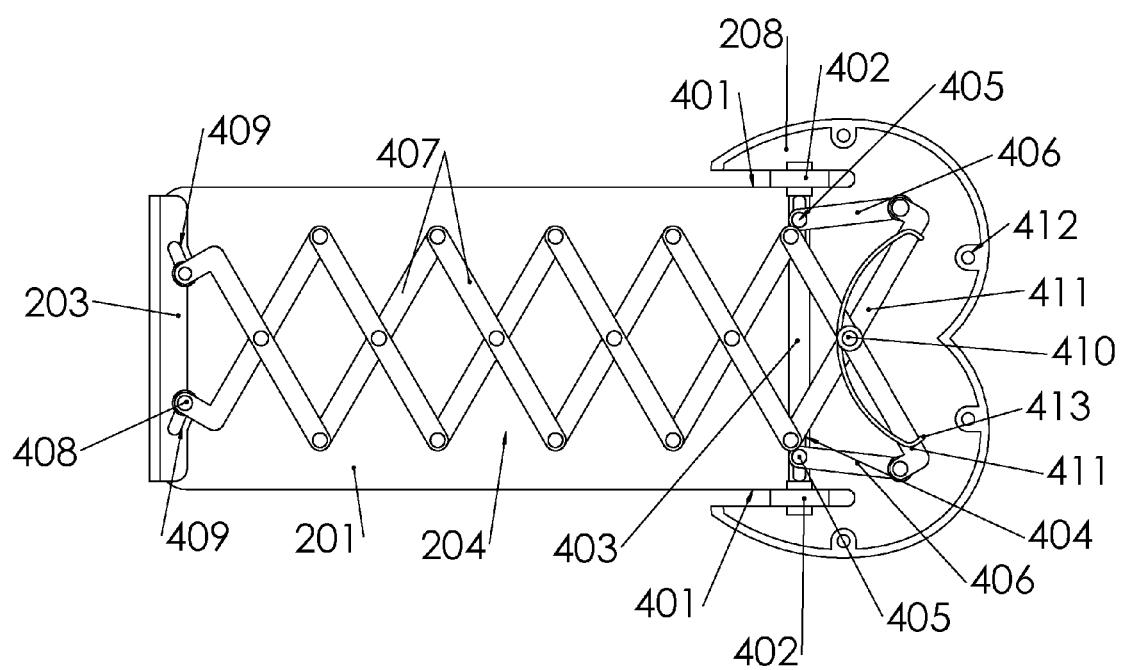
FIG. 4 is a fragmented top view of pushing mechanism (pantograph) in its exploded position
Figure 5:
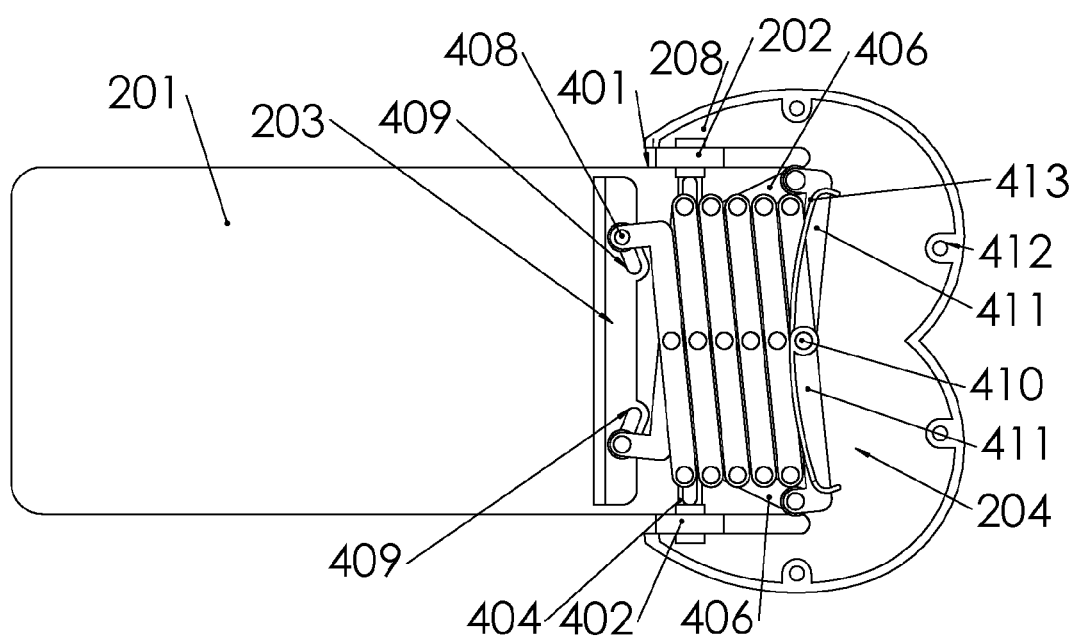
FIG. 5 is a fragmented top view of pushing mechanism (pantograph) in its aggregated position

The cake cutter-server (see FIG. 2) consists of a spatula 201 (holder for a sliced piece of cake or alike), blades 202 having the shape of rectangular frame, pusher plate 203 of the sliced piece that operates by the pantographic mechanism 204. Blades 202 are rigidly connected to the lower operating handle 205. The upper operating handles are rigidly connected to the supporting wall 206. The operating handles 205 have a form of tabs for fingers like ordinary scissors. Similar to ordinary scissors, the operating handles 205 are pivotally connected to the rivet 209, which is fixed on the upper operating handle. Thus, the blades 202 along with the lower operating handle 205 turn around the rivet 209. Supporting wall 206 is attached to the cover 207 of the pantograph 204. In an aggregated position, pantograph 204 is located in the box 208, which in turn is rigidly connected to the spatula 201. On the cover 207 and on the basis of the box 208 are made the blade slots 401 (see FIG. 4) to allow the edges of the blades 202 move freely through the box 208. Pantograph 204 explodes by pushing the guiding rolls 402 with edges of the blades 202. The rolls 402 are freely attached to the axis 403 and can freely move in the blade slots 401. On the axis 403 are made two axis slots 404 in which the intermediate arm rivets 405 are located. The first pair of pantograph's 204 strut members is connected to the said axis 403 with the use of the intermediate levers 406 by rivets on both ends. On the attached figures is shown the pantograph with six pairs of the strut members 407. The last pair of said strut members is connected to the pusher plate 203 by rivets 408 located in the pusher slots 409. The axis 410 of the first pair 411 of the pantograph's 204 strut members is stationary attached to the bottom of the box 208 (practically, to the spatula 201). The cover 207 of the box 208 is attached to said box with screws that are screwed to the screw-nuts 412 welded to the wall of the box 208. The spring 413 returns the exploded pantograph 204 to the aggregated position.

The proposed cake cutter-server operates as following. In the starting position (see FIG. 2), the operating handles 205 are fully moved apart, the blades 202 are maximally raised, and the pusher plate 203 touches the supporting wall 206. Fingers of operator's hand are in the tabs of the operating handles 205 (similar to operation of ordinary scissors). The operator moves the spatula 201 toward a cake or alike and slides it under the cake. If it is necessary to cut large pieces, the spatula slides underneath the cake for its entire length until the side of a cake touches the pusher plate 203. If the cutting pieces are to be small, the spatula slides underneath a cake partially. Then, by pushing the operating handles 205 toward each other, the blades 202 are moved down getting inside the cake until the blades 202 reach the spatula's level. This means that a piece of cake is completely detached from the whole and placed on the spatula 201. Then, the cake cutter-server is moved back from the whole cake. In this condition, a sliced piece is substantially placed on the spatula because of girth of the blades 202, which allows easy moving of a cut piece from the whole to the serving plate. When outer edge of the spatula 201 is placed on the edge of the serving plate, the handles 205 are pushed toward each other more. The blades move lower of the spatula is level, and a piece of cake releases. Starting from this position, back edges of the blades 202 slide in the slots 401 of the pantograph's box 208 pushing the rolls 402-402 backward (see FIG. 4). Along with the rolls, the axis of the rolls 403 moves, which results in moving apart the intermediate arm rivets 405. As a result, the first pair of pantograph's 204 strut members 411 explodes. Since the connection axis 410 of the first pair of pantograph's arms 411 is stationary fixed to the spatula 201, all strut members 407 of the pantograph 204 explode and the pusher plate 203 slides along the spatula 201 and pushes the sliced piece of cake or alike from the spatula 201 to a serving plate. Then the device is returned to its starting position by pulling apart the operating handles from each other. The spring 413 aggregates all strut members of the pantograph 204 into the box 208, which pulls back the pusher plate 203 returning it to its starting position. Now the cake cutter-server is ready to cut the next piece.

Figure 6:
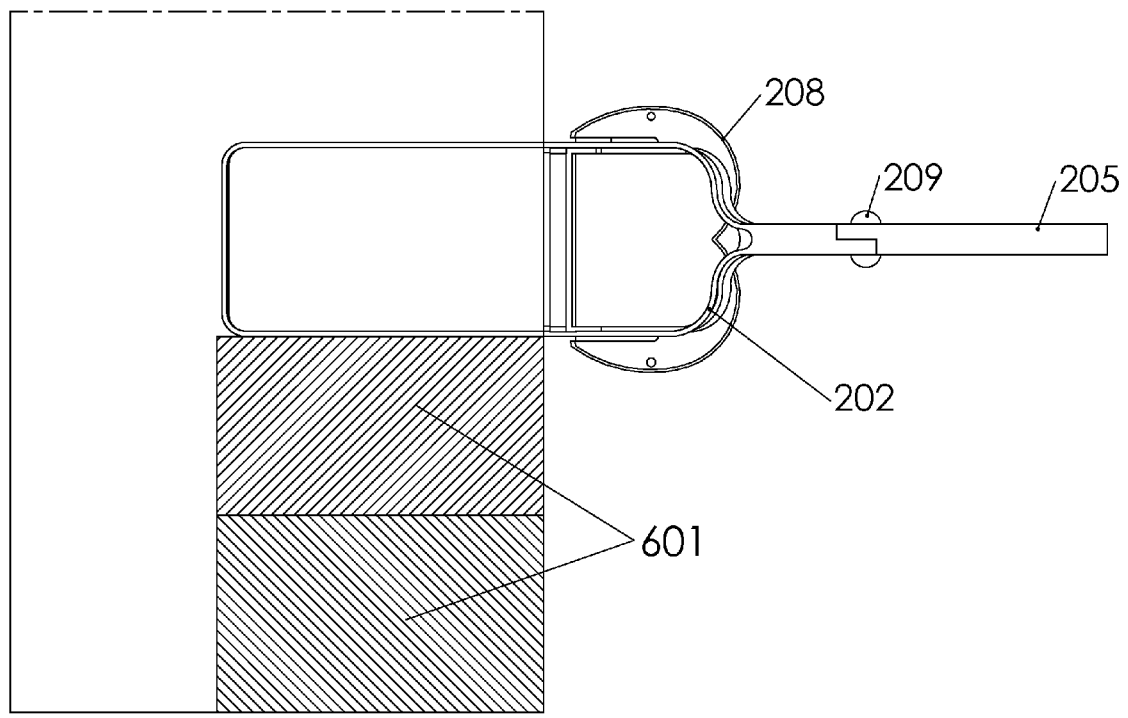
FIG. 6 is operating option for slicing rectangular cakes
Figure 7:
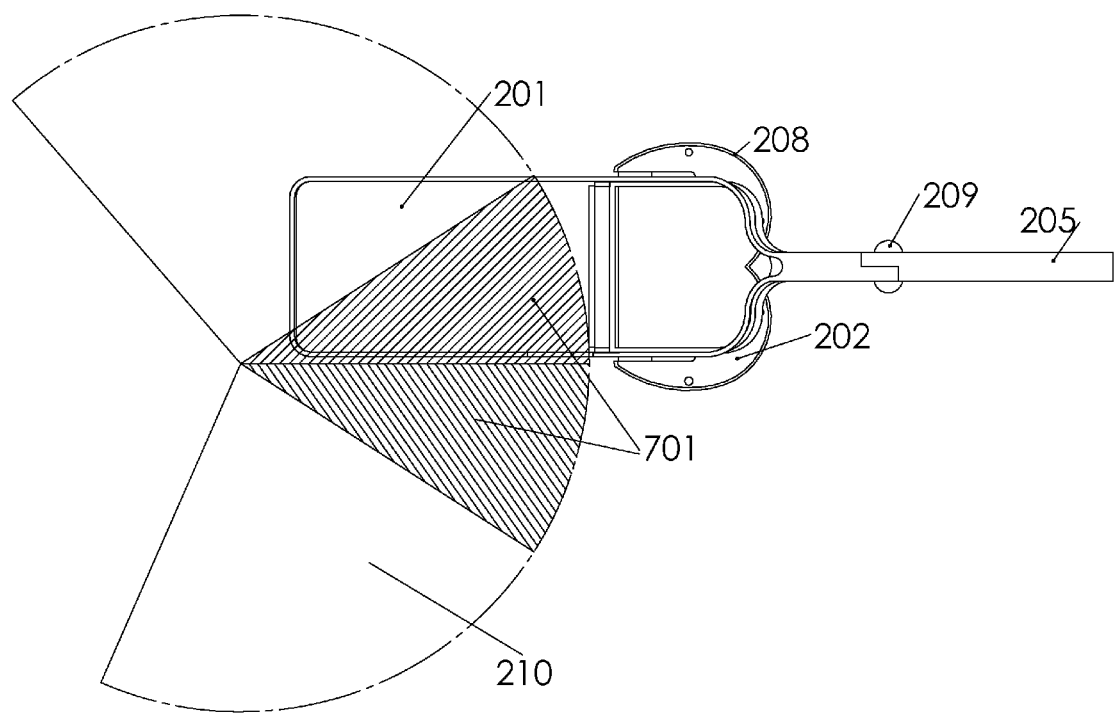
FIG. 7 is operating option for slicing round cakes

In addition to cutting rectangular pieces 601 (FIG. 6), the device can be used for slicing round cakes 210 (see FIG. 7). To do this, it is necessary to switch the axis of the cake cutter-server to the right. In this case, slicing is realized only by the left side of the blades 202. The right side moves idly. Cakes of small diameters can be sliced into the triangular segments 701.

I claim:

1. A utensil for cutting and serving a piece of pastry or similar goods in an upright position by a one hand operation, comprising:
    a first and a second operating handle connected at a pivot;
    a cutting blade for cutting the piece connected to the first operating handle wherein pivoting the first and second operating handles causes actuation of the blade; and
    a serving mechanism connected to the second operating handle, said serving mechanism further comprising:
        a spatula;
        a pusher plate; and
        a pantographic linkage mounted between a forward end connected to the pusher plate and a rearward end such that extension of the linkage causes relative movement of the forward and rearward ends such that extension of the linkage causes relative movement of the forward and rearward ends away from each other and causes movement of the pusher plate in a direction of the spatula away from the direction of the pivot whereas contraction of the linkage causes relative movement of the forward and rearward ends toward each other and retracts the pusher plate toward the pivot;
    wherein the pantographic linkage is actuated by movement of the first and second operating handles relative to each other.

2. The utensil of claim 1, further comprising:
    a first finger tab formed in the first operating handle; and
    a second finger tab formed in the second operating handle;
    wherein the first and second finger tabs allow the utensil to be operated by at least two fingers of a user's hand.

3. The utensil of claim 2, wherein the cutting blade has three sides.

4. A utensil for cutting and serving a piece of pastry or similar goods in an upright position by a one hand operation, comprising:
    a first and a second operating handle connected at a pivot;
    a cutting blade for cutting the piece connected to the first operating handle; and
    a serving mechanism connected to the second operating handle, further comprising:
        a spatula;
        a pusher plate; and
        a pantographic linkage connected to the pusher plate at a forward end of the pantographic linkage mechanism;
    wherein the pantographic linkage is actuated by movement of the first and second operating handles relative to each other, said pantographic linkage mechanism moving the pusher plate outwardly away from the direction of the pivot in the direction of the forward end when the pantographic linkage mechanism is actuated into an extension mode from an aggregated position and moving the pusher plate inwardly toward the direction of the pivot when the pantographic linkage mechanism is retracted into the aggregated position; and
    wherein movement of the first and second operating handles away from each other causes the cutting blade to move away from the spatula.

5. The utensil of claim 4, further comprising:
    a first finger tab formed in the first operating handle; and
    a second finger tab formed in the second operating handle;
    wherein the first and second finger tabs allow the utensil to be operated by at least two fingers of a user's hand.

6. The utensil of claim 4, wherein the cutting blade has three sides.

* * * * *